(12) United States Patent
Corbett (10) Patent No.: US 11,187,638 B2
(45) Date of Patent: Nov. 30, 2021

(54) PARTICLE CHARACTERISATION

(71) Applicant: Malvern Panalytical Limited, Malvern (GB)

(72) Inventor: Jason Corbett, Malvern (GB)

(73) Assignee: Malvern Panalytical Limited, Malvern (GB)

( * ) Notice: Subject to any disclaimer, the term of this patent is extended or adjusted under 35 U.S.C. 154(b) by 0 days.

(21) Appl. No.: 16/085,169

(22) PCT Filed: Mar. 16, 2017

(86) PCT No.: PCT/GB2017/050733
§ 371 (c)(1),
(2) Date: Sep. 14, 2018

(87) PCT Pub. No.: WO2017/158368
PCT Pub. Date: Sep. 21, 2017

(65) Prior Publication Data
US 2019/0078990 A1   Mar. 14, 2019

(30) Foreign Application Priority Data
Mar. 16, 2016 (GB) ..................... 1604460

(51) Int. Cl.
*G01N 15/02* (2006.01)
*G01N 15/00* (2006.01)

(52) U.S. Cl.
CPC ...... *G01N 15/0211* (2013.01); *G01N 2015/0222* (2013.01); *G01N 2015/035* (2013.01)

(58) Field of Classification Search
CPC .............. G01N 215/0222; G01N 15/0211
See application file for complete search history.

(56) References Cited

U.S. PATENT DOCUMENTS

| | | | |
|---|---|---|---|
| 4,074,939 A | | 2/1978 | Rabl |
| 4,178,917 A | * | 12/1979 | Shapiro ............... A61B 5/0071 |
| | | | 356/317 |
| 4,473,296 A | | 9/1984 | Shofner et al. |
| 4,537,861 A | * | 8/1985 | Elings ................... G01N 21/17 |
| | | | 356/317 |

(Continued)

FOREIGN PATENT DOCUMENTS

| CN | 1502981 A | 6/2004 |
|---|---|---|
| CN | 101118210 A | 2/2008 |

(Continued)

OTHER PUBLICATIONS

Extended Search Report dated Sep. 22, 2017, directed to European Application No. 17162676.5; 11 pages.

(Continued)

*Primary Examiner* — Shawn Decenzo
(74) *Attorney, Agent, or Firm* — Morrison & Foerster LLP (57) ABSTRACT

An apparatus for particle characterisation, comprising: a sample cell for holding a sample; a light source configured to illuminate the sample with an illuminating beam and a plurality of light detectors, each light detector configured to receive scattered light resulting from the interaction between the illuminating beam and the sample along a respective detector path, wherein each respective detector path is at substantially the same angle to the illuminating beam.

27 Claims, 7 Drawing Sheets

(56) References Cited

U.S. PATENT DOCUMENTS

| | | | |
|---|---|---|---|
| 4,690,561 A * | 9/1987 | Ito | G01N 15/1434 250/201.1 |
| 4,710,025 A | 12/1987 | Wyatt et al. | |
| 4,975,237 A * | 12/1990 | Watling | G01J 3/02 356/338 |
| 5,166,052 A | 11/1992 | Cercek | |
| 5,956,139 A * | 9/1999 | Meyer | G01N 15/0211 356/338 |
| 6,016,193 A | 1/2000 | Freeman et al. | |
| 6,016,195 A * | 1/2000 | Peters | G01J 3/02 356/337 |
| 6,052,184 A | 4/2000 | Reed | |
| 6,509,161 B1 | 1/2003 | Barker et al. | |
| 7,119,900 B2 | 10/2006 | Okumura | |
| 8,729,502 B1 | 5/2014 | Klotzkin | |
| 8,854,621 B1 | 10/2014 | Muschol | |
| 9,341,559 B2 * | 5/2016 | Carr | G01N 15/0211 |
| 10,006,851 B2 | 6/2018 | McNeil-Watson et al. | |
| 10,197,485 B2 | 2/2019 | Corbett et al. | |
| 10,359,361 B2 * | 7/2019 | Nadkarni | G01N 21/4788 |
| 10,365,198 B2 * | 7/2019 | Corbett | G01N 15/0211 |
| 2004/0011975 A1 | 1/2004 | Nicoli | |
| 2005/0013746 A1 | 1/2005 | Lee et al. | |
| 2005/0179904 A1 | 8/2005 | Larsen et al. | |
| 2007/0229823 A1 | 10/2007 | Sung et al. | |
| 2008/0079939 A1 | 4/2008 | Fiolka et al. | |
| 2008/0221814 A1 | 9/2008 | Trainer | |
| 2009/0073456 A1 * | 3/2009 | Wax | G01N 21/4795 356/479 |
| 2010/0238436 A1 | 9/2010 | Havard | |
| 2011/0090500 A1 * | 4/2011 | Hu | G01N 15/147 356/337 |
| 2012/0008143 A1 | 1/2012 | Ihlefeld | |
| 2012/0044493 A1 | 2/2012 | Smart et al. | |
| 2012/0281215 A1 * | 11/2012 | Peters | G01N 21/51 356/343 |
| 2013/0218519 A1 * | 8/2013 | Tochino | G01B 11/105 702/157 |
| 2013/0320216 A1 * | 12/2013 | Aiko | G01B 11/303 250/349 |
| 2014/0050619 A1 | 2/2014 | Meller | |
| 2014/0226158 A1 * | 8/2014 | Trainer | G02B 6/32 356/336 |
| 2016/0202164 A1 * | 7/2016 | Trainer | G01N 15/0211 |
| 2017/0102329 A1 * | 4/2017 | Corbett | G01N 21/64 |
| 2017/0248510 A1 * | 8/2017 | Pedrono | G01N 15/1404 |
| 2017/0307495 A1 * | 10/2017 | Corbett | G01N 15/0211 |
| 2017/0322133 A1 * | 11/2017 | Trainer | G01N 15/0211 |
| 2018/0188148 A1 * | 7/2018 | Trainer | G01N 15/0211 |
| 2018/0231448 A1 * | 8/2018 | Moenkemoeller | G01N 21/53 |
| 2018/0236452 A1 | 8/2018 | Corbett | |
| 2018/0266931 A1 | 9/2018 | Corbett | |
| 2018/0275038 A1 * | 9/2018 | Cantin | G01N 21/49 |
| 2019/0234852 A1 * | 8/2019 | Scullion | G01N 15/1434 |
| 2019/0242805 A1 | 8/2019 | Corbett et al. | |
| 2019/0317002 A1 | 10/2019 | Corbett et al. | |
| 2019/0383719 A1 | 12/2019 | Corbett et al. | |
| 2020/0025665 A1 * | 1/2020 | Trainer | G01N 15/1459 |
| 2020/0033245 A1 | 1/2020 | Corbett et al. | |
| 2021/0208047 A1 | 7/2021 | Corbett et al. | |

FOREIGN PATENT DOCUMENTS

| | | |
|---|---|---|
| CN | 101477023 A | 7/2009 |
| CN | 102066901 A | 5/2011 |
| CN | 202275041 U | 6/2012 |
| CN | 202453283 U | 9/2012 |
| CN | 103069265 A | 4/2013 |
| CN | 103257097 A | 8/2013 |
| CN | 103585940 A | 2/2014 |
| CN | 104662407 A | 5/2015 |
| EP | 1291642 A1 | 3/2003 |
| EP | 2365313 A1 | 9/2011 |
| EP | 2869054 A1 | 5/2015 |
| EP | 3379232 A1 | 9/2018 |
| JP | H1-503178 A | 10/1989 |
| JP | H2-228069 A | 9/1990 |
| JP | H5-172730 A | 7/1993 |
| JP | 2002-71567 A | 3/2002 |
| JP | 2002-196222 A | 7/2002 |
| JP | 2002-341173 A | 11/2002 |
| JP | 2006-71497 A | 3/2006 |
| JP | 2014-518379 A | 7/2014 |
| WO | 89/00286 A1 | 1/1989 |
| WO | 96/22521 A1 | 7/1996 |
| WO | 03/023375 A2 | 3/2003 |
| WO | 2007/126389 A1 | 11/2007 |
| WO | 2008/092272 A1 | 8/2008 |
| WO | 2009/090562 A2 | 7/2009 |
| WO | 2012/172330 | 12/2012 |
| WO | 2014/065694 A1 | 5/2014 |
| WO | 2017/051149 A1 | 3/2017 |
| WO | 2018/172362 A1 | 9/2018 |

OTHER PUBLICATIONS

International Search Report and Written Opinion dated Jan. 12, 2016, directed to PCT Application No. PCT/GB2016/052786; 9 pages.

International Search Report and Written Opinion dated May 17, 2018, directed to PCT Application No. PCT/EP2018/057033; 17 pages.

International Search Report and Written Opinion dated Oct. 9, 2009, directed to International Application No. PCT/IB2009/005020; 10 pages.

Zhu et al., "Analysis of Noisy Dynamic Light Scattering Data Using Constrained Regularization Techniques," Applied Optics 51(31): pp. 7537-7548.

Corbett et al., U.S. Office Action dated Nov. 29, 2019, directed to U.S. Appl. No. 16/414,961; 6 pages.

International Search Report and Written Opinion dated Jun. 19, 2017, directed to International Application No. PCT/GB2017/050733; 13 pages.

"Zetasizer Nano Series," (Aug. 2009) User Manual published by Malvern; 308 pages.

Corbett, U.S. Office Action dated Jan. 23, 2019, directed to U.S. Appl. No. 15/750,971; 12 pages.

Glidden et al. (Apr. 2012) "Characterizing Gold Nanorods in Solution Using Depolarized Dynamic Light Scattering," Journal of Physical Chemistry C 116(14): 8128-8137.

International Search Report and Written Opinion dated Dec. 22, 2016, directed to International Application No. PCT/GB2016/052924; 13 pages.

Ocean Optics Instruction Manual. (2011) "qpod: Temperature-Controlled Sample Compartment for Fiber Optic Spectroscopy," located at <http://oceanoptics.com/wp-content/uploads/qpod-manual.pdf> visited on Dec. 8, 2016, 14 pages.

Pike Technologies Product Data Sheet. (2013) "Falcon UV-VIS— Precise Cell Temperature Control Accessory," located at <http://www.piketech.com/files/pdfs/FalconPDS1413.Pdf> visited on Dec. 8, 2016, 1 page.

Notice of Reasons for Refusal dated Aug. 25, 2020, directed to Japanese Application No. 2018-515574; 8 pages.

Notification of the First Office Action dated Mar. 30, 2020, directed to CN Application No. 2016800682135; 15 pages.

The First Office Action dated Apr. 29, 2020, directed to CN Application No. 201680055058.3; 19 pages.

Notice of Reasons for Refusal dated Mar. 10, 2020, directed to JP Application No. 2018-548932; 9 pages.

Corbett et al, U.S. Office Action dated Dec. 7, 2020, directed to U.S. Appl. No. 16/496,027; 10 pages.

Corbett et al., U.S. Notice of Allowance dated Jan. 12, 2021, directed to U.S. Appl. No. 16/558,763; 11 pages.

Corbett et al., (2012). "Measuring surface zeta potential using phase analysis light scattering in a simple dip cell arrangement", Colloids and Surfaces A: Physiochemical and Engineering Aspects 396: 169-176.

(56) References Cited

OTHER PUBLICATIONS

Final Notification of Reason for Refusal dated Apr. 6, 2021, directed to JP Application No. 2018-548932; 10 pages.
Notice of Reasons for Refusal dated Sep. 8, 2020, directed to JP OA 2018-535260; 8 pages.
Office Action dated May 18, 2021, directed to GB Application No. 17186530.6; 7 pages.
Corbett et al., U.S. Office Action dated Apr. 21, 2021, directed to U.S. Appl. No. 16/496,027; 11 pages.

\* cited by examiner

PARTICLE CHARACTERISATION

CROSS-REFERENCE TO RELATED APPLICATIONS

This application is a national stage application under 35 USC 371 of International Application No. PCT/GB2017/050733 filed Mar. 16, 2017, which claims the priority of GB Application No. 1604460.4, filed Mar. 16, 2016, the entire contents of which are incorporated herein by reference.

FIELD OF THE INVENTION

The present invention relates to an apparatus for particle characterisation.

BACKGROUND OF THE INVENTION

Light scattering methods for particle characterisation, particularly dynamic light scattering (DLS), have long been criticised for susceptibility to poor sample quality due to the $R^6$ dependency of the strength of the scattered light (for a particle of radius R). This dependency means that tiny fractions of aggregated material, commonly found and of interest in pharmaceutical applications, dominate the measurement, with an attendant reduction in the accuracy of the size measurement of the much smaller, more weakly scattering fraction. Significant efforts regarding sample preparation, filtering, scrupulous cleaning of beakers, containers, sample cuvettes etc. are typically required in order to accurately measure what are often very low concentrations of the smaller protein fractions, so as to ensure that aggregated material or filter spoil is not present in the sample.

Further, data rejection schemes are often used that simply reject data that is highly variable in count rate. The highly variable count rates arise when larger particles or aggregates are within the scattering volume (defined by the intersection of the illumination beam and detection beam), effectively ceasing acquisition of data until the aggregate or larger particle has moved out of the detector volume within the sample. As such, using DLS requires a large amount of preparation time for potentially few measurements.

An apparatus for solving or ameliorating at least some of the above mentioned problems is desirable.

SUMMARY OF THE INVENTION

According to the first aspect of the invention, there is provided an apparatus for particle characterisation, comprising a sample cell for holding a sample, a light source and a plurality of light detectors. The light source is configured to illuminate the sample with an illuminating beam and each light detector is configured to receive scattered light resulting from the interaction between the illuminating beam and the sample, along a respective detector path. Each respective detector path is at substantially the same angle to the illuminating beam.

The intersection between the illuminating beam and each respective detector path may be termed the detection region or scattering volume.

Multiple detection points may have an advantage of providing very fast measurement times. The total measurement time may be inversely proportional to $N^2$, where N is number of channels. Eight channel fibre arrays are commercially available that have the potential to provide a reduction in measurement time by a factor of $1/64=0.015625$. For example, this would reduce a 1 minute measurement time to less than 0.95 s.

In a conventional light scattering instrument, a single detector (at a single scattering angle) is used. In order to obtain a measurement with an appropriate signal to noise ratio, it may be necessary to continue the measurement for a relatively long period. Over a long period, the effect of noise on the correlogram obtained from the signal is reduced. It is also known to use multiple light detectors, each at different angles, to perform a multi-angle dynamic light scattering measurement, thereby increasing the precision of a measurement.

According to an embodiment, each detector may produce an intensity signal in response to the received scattered light. The apparatus may comprise a processor configured to autocorrelate each intensity signal to produce a plurality of autocorrelation functions. The processor may combine each autocorrelation function to produce a total autocorrelation function (for example by adding together each autocorrelation function value at each correlation time) corresponding with the particular scattering angle. The total autocorrelation function may be normalised. The total autocorrelation function may correspond with the average of the autocorrelation functions. An effect of combining the autocorrelations in this way is to reduce the measurement time required to provide sufficient signal to noise ratio in the autocorrelation function.

In order to maximise the speed advantage, the processor may be configured to perform the autocorrelation function on each intensity signal at least partly in parallel. This is not essential, and the significance of the time taken to perform the correlation operation depends on the speed of the processor—it may be appropriate to perform the correlation operation sequentially if the processor is sufficiently fast.

The present invention does not preclude further light detectors at different angles: at least one the detection angles in such an apparatus may be a "fast" angle, comprising multiple light detectors at the same angle. Where there is more than one "fast" angle, the instrument may be configured to perform multi-angle DLS, by combining autocorrelation functions within each "fast" angle, as described above.

The processor may be configured to determine, from the total autocorrelation function, at least one of: a particle size ($Z_{average}$), a polydispersity index (pdi) and a particle size distribution. Appropriate methods for doing so include the well-known cumulants method, the CONTIN algorithm, or any other deconvolution method.

The processor may be configured to identify and discard, or analyse separately, intensity signals and/or autocorrelation functions corresponding with contaminants or large particles. The identification may be based on predetermined rejection threshold or a dynamic rejection threshold.

In order to deal with large particles contaminating the intensity signal, the processor may be configured to identify portions of each intensity signal that comprise scattering from a larger particle or a contaminant (for example, based on an intensity threshold). An intensity signal that comprises scattering from a large particle may be partly or completely discarded (prior to autocorrelation and combining).

One method for identifying intensity signals with larger particles or contaminants is to perform an autocorrelation operation. If the intercept of the autocorrelation function is below a threshold value, that may indicate a noisy measurement. A polydispersity index or $Z_{average}$ particle size may be used as a criteria for identifying signals that comprise contaminants or larger particles. For each criteria mentioned herein, a predetermined threshold value may be used or a dynamic rejection threshold may be determined based on the ensemble measurement data (e.g. based on the statistical properties of the measurement data). For example a mean intensity, pdi, or $Z_{average}$ may be determined for the data (as a whole), and a threshold for rejection may be set based on a number of standard deviations from that mean value. Such a dynamic threshold has the advantage of being more widely applicable to different measurement scenarios. Measurement data that is identified as rejected may be excluded from the total autocorrelation function, and/or analysed separately (e.g. to investigate aggregates and/or contaminants).

The illumination beam is preferably provided by a laser. The light detectors may be avalanche photodiodes (APDs), or other photon counting devices suitable for static, dynamic or electrophoretic light scattering measurements. Examples of parameters that can be determined using these measurements include molecular weight determination, size and electrophoretic mobility, and zeta potential.

A surface zeta potential of a surface may be determined from the movement of particles (e.g. tracer particles) dispersed in the (electrolyte) sample adjacent to the surface. An electrical field may be applied parallel to the plane of the surface (e.g. by a first and second electrode). Near to the surface, electro-osmosis particle transport will dominate, in a first direction, parallel with the surface. Further from the surface, electrophoretic particle transport will dominate, in an opposite second direction.

The skilled person will be aware that movement of particles in a detection region may be determined by detecting a frequency shift in modulated scattered light arising from the Doppler effect. Any suitable method can be used to do this, such as Fourier analysis or PALS (Phase Analysis Light Scattering), which determines a phase shift between a reference beam and the scattered light.

In order to determine the surface zeta potential, it may be necessary to obtain measurements from detection regions at a plurality of distances from the surface, so as to determine the relationship between electro-osmic and electrophoretic particle transport. In the prior art, this may be achieved by moving the surface in the sample relative to a fixed detection region. Embodiments of the present invention may provide detection regions at a plurality of distances from the surface, each detection region corresponding with a detector path. This may enable a surface zeta potential measurement to be obtained rapidly, without any need to adjust a position of the surface or optics.

The apparatus may comprise a modulator (e.g. a moving mirror, or acousto-optic modulator), configured to provide modulation to the illumination beam or detection paths. The apparatus may comprise a beam splitter configured to provide a portion of the illumination beam to at least one of the detectors, for performing heterodyne detection by mixing with the scattered light.

The apparatus may comprise a processor configured to determine a zeta potential from output signals from the plurality of light detectors, each output signal corresponding with a measurement location of a respective detector path.

The angle between the illumination beam and the plurality of detection paths may be either acute, as in the case of forward angle scattering detection (for example zeta potential measurements), or obtuse, for example as appropriate for backscatter detection (for use in size detection geometries), or the detection paths may be normal to the illumination beam.

The apparatus may further comprise a plurality of optical fibres, each optical fibre corresponding with a light detector and arranged to couple light from the respective detector path to the corresponding light detector.

A single-mode fibre is a convenient and simple way of collecting light from within a single coherence area, although it can be appreciated that multi-mode fibres or few-mode fibres could be used.

The optical fibres may be polarising or polarisation maintaining. Maintaining or selecting a particular polarisation state may enable additional information to be determined about the sample particles (e.g. morphology).

The optical fibres may be arranged to receive the scattered light from the detector path at a first end portion and the first end portions of each fibre may be substantially parallel. One advantage of this set-up is ease of production and optical alignment.

Alternatively, each optical fibre may be oriented at different angles. In either case (parallel or different angled fibre ends), the end portions of the fibres may be supported by one or more fibre support members.

The first end portions of each optical fibre may comprise a one dimensional array of fibres.

The optical fibre array may be 50 µm to 500 µm pitch.

The first end portions of each optical fibre may comprise a two dimensional array of fibres. Any convenient packing arrangement may be used such as a rectangular array, or hexagonal-packed array. This would allow for domain size to be detected, where a domain is a region of common behaviour within a sample.

The apparatus may further comprise one or more fibre support members.

The fibre support members may support the first end portions of the optical fibres by an array of "V" grooves in a fibre support member.

The first end portions of each optical fibre consist of an optical fibre core, from which any associated cladding, buffer and/or jacket may have been removed.

This enables a greater packing density of optical fibres in a small region, facilitating a large number of detection locations within a small volume. Each optical fibre in the array may be 50 µm to 500 µm in diameter, so that the detection volume remains very small with attendant minimised sample volumes in order to accommodate the array of detection points.

As an alternative to optical fibres, the apparatus may comprise a plurality of pin-hole apertures, wherein each light detector is configured to receive light from the respective detector path via a corresponding pin-hole aperture.

This alternative may give a similar performance to using a single mode fibre. Using a suitably restricted field of view of a non-fibre, bulk optical system may result in a pin-hole coherence area imaged onto a detector with other light rejected by the stop (or pin hole aperture). This traverses the use of polarisation maintaining fibres, which may facilitate measurements that rely on the polarisation state of the detected light.

The apparatus of any preceding statement may further comprise a plurality of lens elements, each lens element corresponding with a light detector and arranged to couple light from the respective detector path to the corresponding light detector.

The plurality of lens elements may comprise an array of lens elements. An array of lens elements would provide high coupling efficiency to the fibre or pin-hole of the light scattered along the detection path. This array may be either a two dimensional lens array or a one dimensional array.

At least some of the plurality of lens elements may have different refractive power. At least some of the plurality of lens elements may be arranged such that different detector paths diverge at different angles before entering their respective optical fibres. Such an arrangement may be used to match the width of each detector optical path with the width of the illumination beam at the detection region (i.e. the region of intersection between the illumination beam and the respective detector optical path). In one example, each lens of the plurality of lens elements may be a gradient-index (GRIN) lens with a different spot size.

The light source may comprise a plurality of light source elements. The light source may be configured to illuminate the sample with a plurality of illuminating beams or a light sheet. Alternatively/additionally, the sample cell may be configured to translate (e.g. be mounted on a transverse or longitudinal translation stage) either normal or parallel to the illuminating beams. This arrangement allows for 3D scattering information to be obtained, and can be applied to any application requiring 2D diffusion coefficient data such as gelling domains, solidification, settling and packing and many others.

The detection path may traverse further optical components between the array of lens elements and the detection points.

The detector paths may be arranged to respectively intersect with the illumination beam (or beams) at a plurality of locations along the illumination beam.

Furthermore, the plurality of locations may be at a plurality of different distances from a sidewall of the sample cell. The sidewall of the sample cell may be a wall that is substantially perpendicular to the illumination beam (i.e. with a surface normal within 15 degrees of parallel to the illumination beam), on the side of the cell nearest to the light source (along the illumination beam).

Each detector path may be arranged to intersect with the illumination path at a different location along the illumination path and/or at a different distance from the sidewall of the sample cell.

The use of multiple light detectors having detection paths with similar angles but at a different location within the sample cell means that if one or more channels is skewed by the presence of an aggregate (or larger particle), then the data from this channel (or channels) could be rejected until the aggregate or filter spoil has cleared. However, data collection in the remaining channels that do not contain aggregates may remain active, as each channel can be analysed independently. Thence, this scheme may be significantly less sensitive to sample preparation and poorer quality sample.

In some embodiments, a method of determining a surface zeta potential, comprises: providing an electrical field in a sample, adjacent to the surface; illuminating a sample with at least one illuminating light beam; detecting light scattered from the illuminating light beam by particles in the sample along a plurality of detector paths, each of the detector paths corresponding with a different light detector, the detector paths corresponding with a plurality of measurement locations at different distances from the surface, and each detector path being at the same angle to the illuminating light beam; determining a surface zeta potential from the detected scattered light.

In some embodiments, a method of determining particle size or particle size distribution, comprises: illuminating a sample with at least one illuminating light beam; detecting light scattered from the illuminating light beam by particles in the sample along a plurality of detector paths, each detector path being at the same angle to the illuminating light beam, so as to produce intensity signals for each detector path; performing an autocorrelation operation on the intensity signals to produce autocorrelation functions; identifying intensity signals and/or autocorrelation functions corresponding with contaminants and/or large particles; combining the autocorrelation functions that are not identified as corresponding with contaminants, to produce a total autocorrelation function; determining the particle size or particle size distribution from the total autocorrelation function.

In some embodiments, a method of determining particle size or particle size distribution, comprises: illuminating a sample with at least one illuminating light beam; detecting light scattered from the illuminating light beam by particles in the sample along a plurality of detector paths, each of the detector paths corresponding with a different light detector, the detector paths corresponding with a plurality of measurement locations at different distances from the centre of a sample cell, each detector path being at the same angle to the illuminating light beam; excluding measurement locations that exhibit multiple scattering and/or insufficient scattering; determining the particle size or particle size distribution from the measurement locations that are not excluded.

The features of each embodiment or aspect may be combined with the features of each other embodiment or aspect, either in isolation or in combination.

The term "comprising" does not exclude other elements or steps, the term "a" or "an" does not exclude a plurality.

BRIEF DESCRIPTION OF THE DRAWINGS

Embodiments of the invention will be described, purely by way of example, with reference to the accompanying drawings, in which.

DETAILED DESCRIPTION OF THE INVENTION

In the following description, similar reference signs are generally used to refer to corresponding or similar features in different embodiments, where the first digit is incremented to correspond to the figure in question (e.g. 110 and 210 correspond to a sample cell in FIGS. 1 and 2 respectively). In this disclosure, the term "back scattered light" refers to scattered light having a component of propagation direction that is opposite to the direction of propagation of the illumination beam, the term "forward scattered light" refers to scattered light having a component of propagation direction in the same direction as the propagation direction of the illumination beam, and "side scattered light" refers to light scattered in a direction perpendicular to the propagation direction of the illumination beam.

Figure 1:
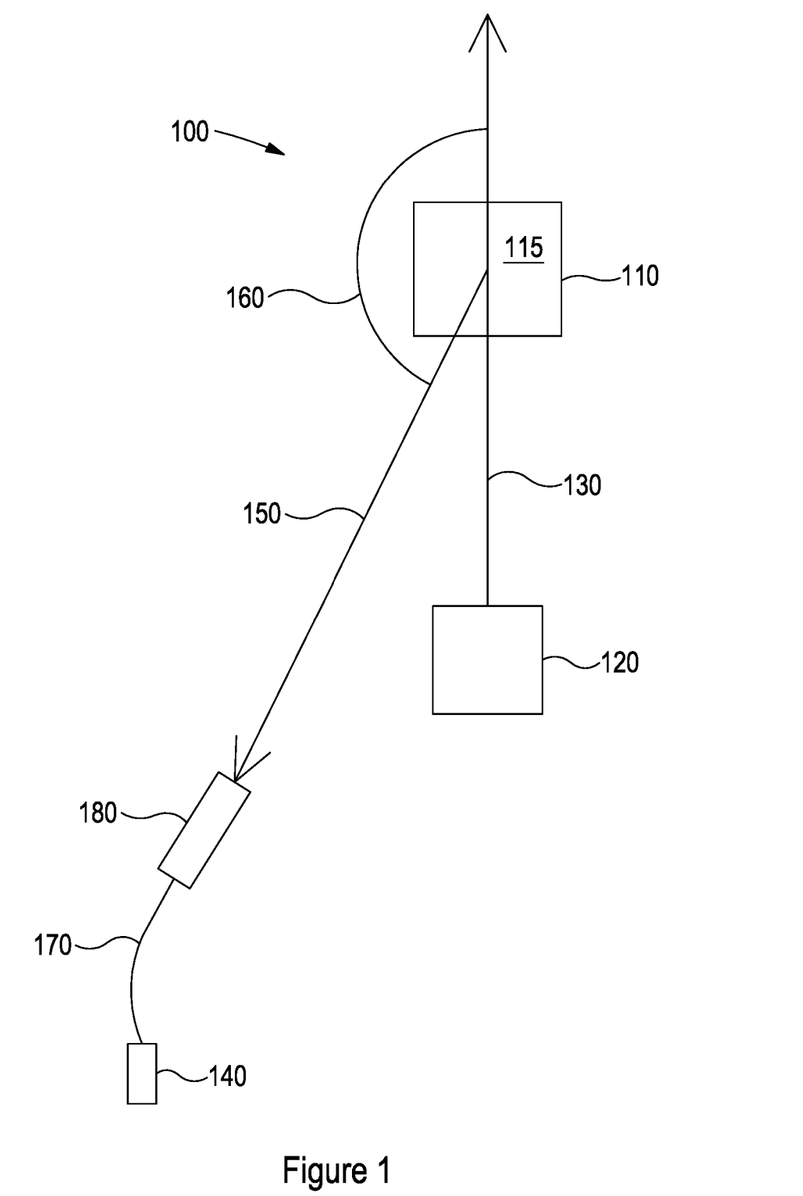
FIG. 1 is a schematic diagram of a prior art light scattering particle characterisation apparatus.

Referring to FIG. 1, a prior art light scattering particle characterisation apparatus 100 is shown, in which a light source 120 illuminates a sample 115 within a sample cell 110. A light detector 140 is configured to receive the scattered light resulting from the interaction between the illumination beam 130 and sample 115, along a detector path 150 at an angle 160 from the illumination beam 130. In this example, an optical fibre 170 is configured to couple light from the detector path 150 to the light detector 140.

Figure 2:
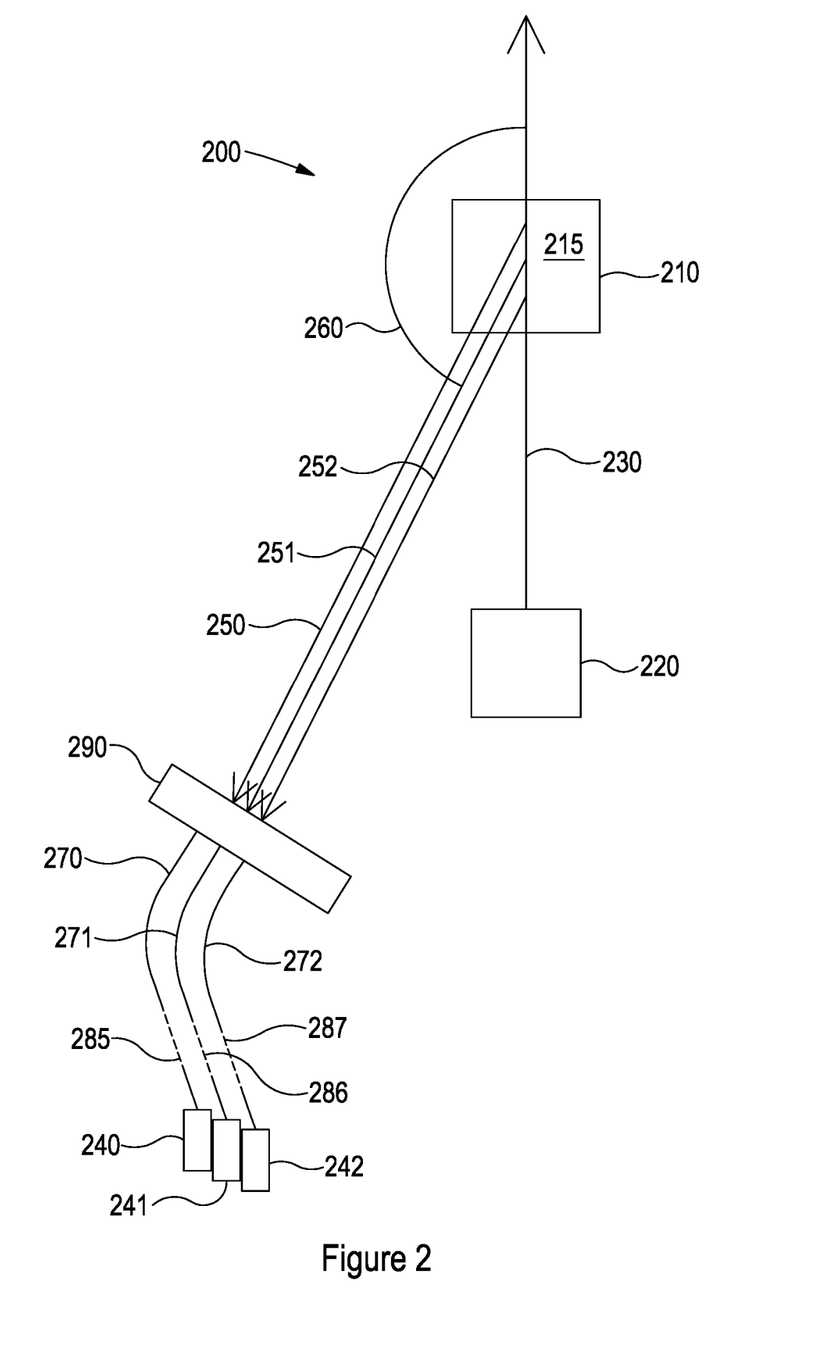
FIG. 2 is a schematic diagram of a light scattering detection arrangement comprising a bundle of fibres in accordance with an embodiment.

Referring to FIG. 2, an example embodiment of an apparatus 200 for particle characterisation is shown. This apparatus 200 comprises a sample cell 210 for holding a sample 215, a light source 220, a plurality of light detectors 240, 241, 242, a plurality of optical fibres 270, 271, 272 and an array of lens elements 290.

The light source 220 is configured to illuminate the sample 215 with an illuminating beam 230. Each light detector 240, 241, 242 is configured to receive scattered light resulting from the interaction between the illuminating beam 230 and the sample 215, along a respective detector path 250, 251, 252. Each respective detector path 250, 251, 252 is at substantially the same angle 260 to the illuminating beam 230, and each optical fibre 270, 271, 272 corresponds with a light detector 240, 241, 242 and is arranged to couple light from the respective detector path 250, 251, 252 to the corresponding light detector 240, 241, 242. Each optical fibre 270, 271, 272 is arranged to receive the scattered light from each respective detector path 250, 251, 252 at a first end portion. The first end portions are substantially parallel. The array of lens elements 290 provides high coupling efficiency to the optical fibres 270, 271, 272 of the light scattered along each detection path 250, 251, 252. The detection paths 250, 251, 252 may traverse further optical components between the array of lens elements and the detection points.

While only three of each component is depicted for clarity, it will be appreciated that more or fewer light detectors and corresponding detector paths may be used.

Figure 3:
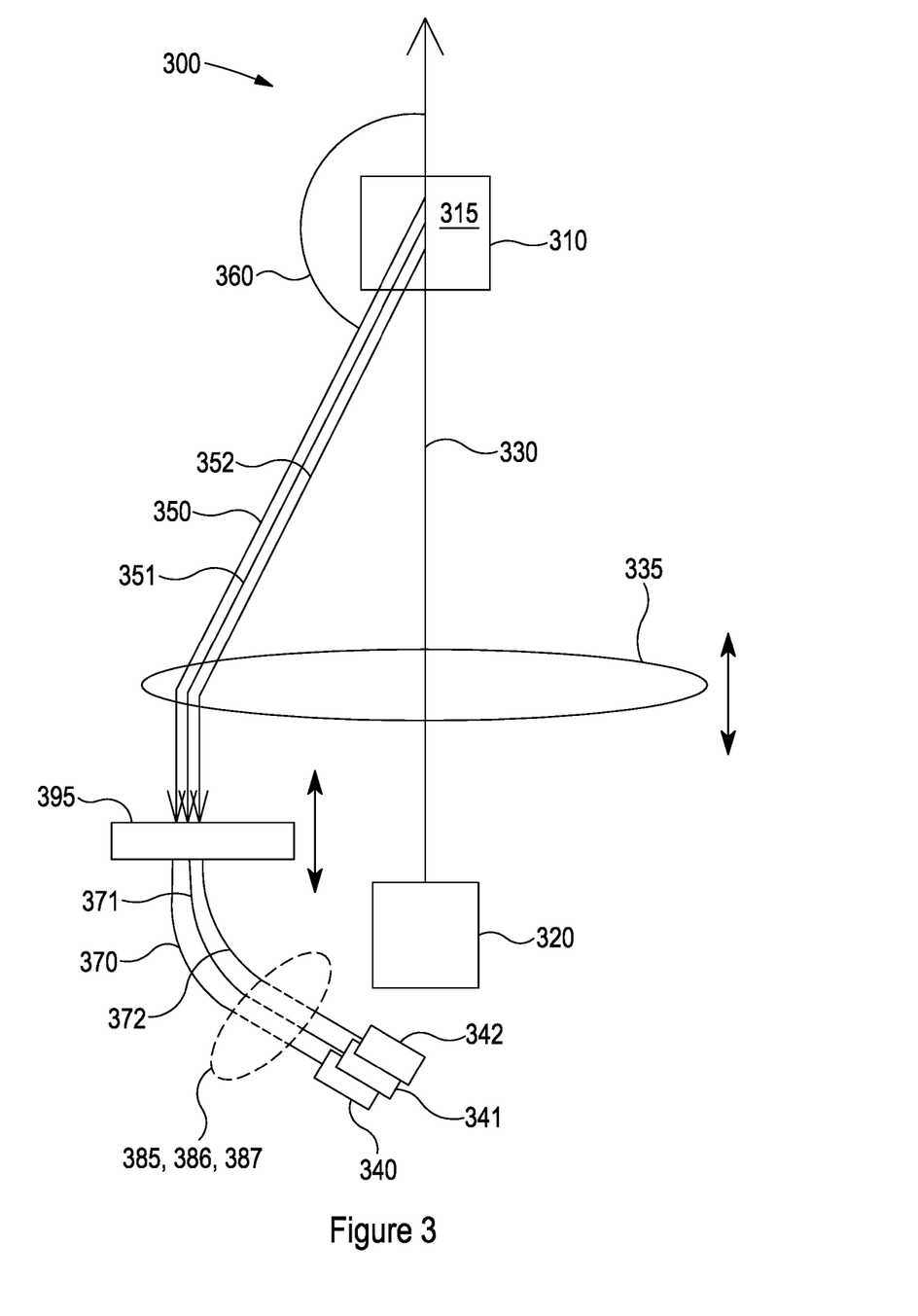
FIG. 3 is a schematic diagram of an alternative embodiment, in which a bundle of fibres defines detection paths that pass through a focussing lens mounted on a translation stage.

Referring to FIG. 3, an example embodiment of an apparatus 300 for particle characterisation is shown. In common with FIG. 2, the apparatus 300 comprises a sample cell 310 for holding a sample 315, a light source 320, a plurality of light detectors 340, 341, 342, a plurality of optical fibres 370, 371, 372 and an array of lens elements 395.

This embodiment shares all the features of the embodiment of FIG. 2, but unlike in FIG. 2, the position of the scattering volume within the sample may be adjusted by translating a moveable lens stage 335. The moveable lens stage 335 may be mounted on a translation stage (e.g. an electrically actuated translation stage). The illumination beam 330 and detection beam paths 351, 352, 353 both pass through the lens 335, and moving the lens 335 therefore varies the position within the sample 315 at which the illumination 330 and detection beams 351, 352, 353 intersect. In some embodiments, at least one of the illumination beam and detection optical paths traverse the moveable lens 335 (it is not necessary for both illumination beam and detection optical paths to traverse the moveable lens 335).

An alternative arrangement (not shown) may omit the movable lens 335 (sometimes referred to as a NIBS lens, or non-invasive back scatter lens) and instead provide a static range of detection locations within the sample 115, each detection location corresponding with the intersection of a detection beam 351, 352, 353 with the illumination beam 330. In a further alternative arrangement, multiple detection locations within the sample may be combined with an optical arrangement that provides the ability to move the plurality of detection points back and forth within the sample 315. The optimal location for the detection region for a sample with low concentration may be at or near the centre of the sample cell. This may reduce scattering contributions from the sample cell wall, and may maximise the scattering signal. The optimal location for a highly concentrated (turbid) sample may be adjacent to a cell wall, so that multiple scattering is minimised, which may reduce the accuracy of the measurement.

In the arrangement of FIG. 3, the optical fibres 371, 372, 373 are optically coupled to the sample cell via a scattering volume location adjustment means 335, 395. This allows the location of the scattering volume associated with the intersection of each illumination light beam and detection light beam to be adjusted. The scattering volume location adjustment means 335, 395 may include further optical components, in addition to the moveable lens element 335. The array of lens elements 395 may be mounted on a translation stage, so as to enable adjustment of the focus of each detection path in the sample, which may enable increased collection efficiency.

Figure 4:
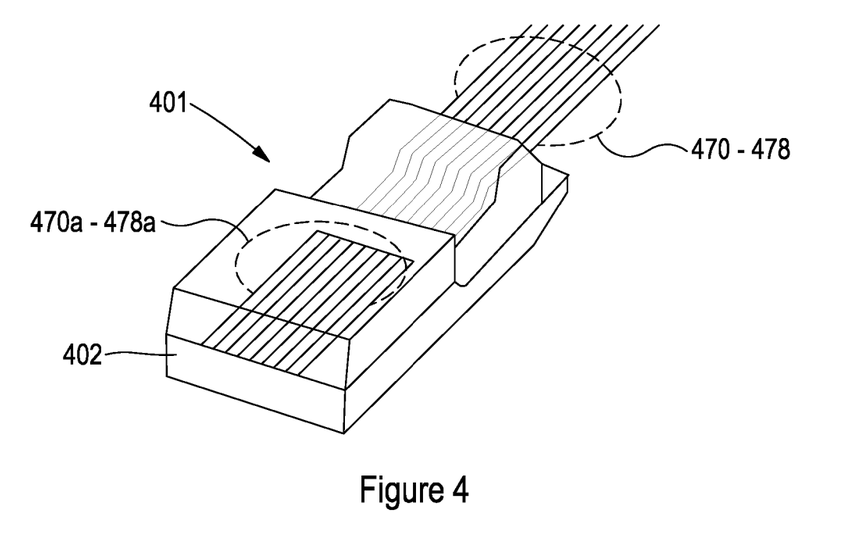
FIG. 4 is an example optical fibre array.

Referring to FIG. 4, an example optical fibre array 401 is shown. The fibre array 401 comprises fibres 470-478 and a fibre-support member 422. The first end portions 470a-478a of each optical fibre 470-478 are arranged in a one-dimensional array. In an alternative arrangement, the first end portions 470a-478a of each optical fibre may be arranged in a two dimensional array. Any convenient packing arrangement may be used such as a rectangular array, or hexagonal-packed array. These first end portions 470a-478a may consist of an optical fibre core, from which any associated cladding, buffer and/or jacket has been removed. As discussed previously, the increases the packing density of the fibres 470-478, which allows for a large number of detection locations within a small volume. The fibre support member 401 supports the first end portions 470a-478a of the optical fibres by an array of "V" grooves.

Figure 5:
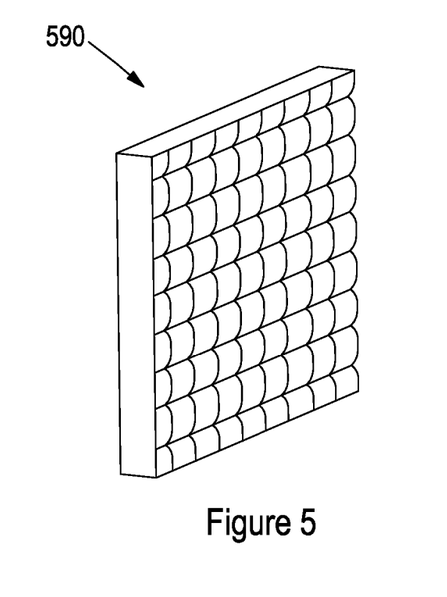
FIG. 5 is an example lens element array.

Referring to FIG. 5, an example lens element array 590 is shown. As discussed previously, optically coupling the optical fibres 271, 272, 273 to the sample cell 210 via an array of lens elements 590 may assist in maximising the coupling efficiency. While a two-dimensional array is depicted, the array may be either a two dimensional lens array or a one dimensional lens array.

Figure 6:
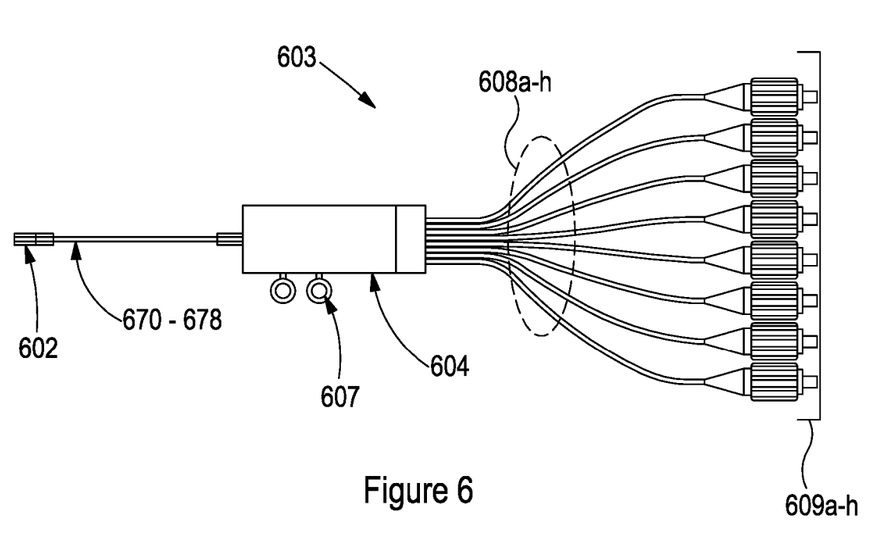
FIG. 6 is an example arrangement for coupling the optical fibres to each light detector.

Referring to FIG. 6, an example apparatus 603 for coupling the optical fibres 670-678 to each light detector is shown. The apparatus comprises the example fibre array 401 of FIG. 4, including the fibre support member 602, a breakout box 604 which can be mounted using mounting holes 607, optical fibres 608a-h for coupling the breakout box to the optical connectors 609a-h. These connectors couple the apparatus to separate light detectors 240, 241, 242 (and so on). In this arrangement, the optical fibres are enclosed in a polyester copolymer (e.g. Hybrel) for protection.

Figure 7:
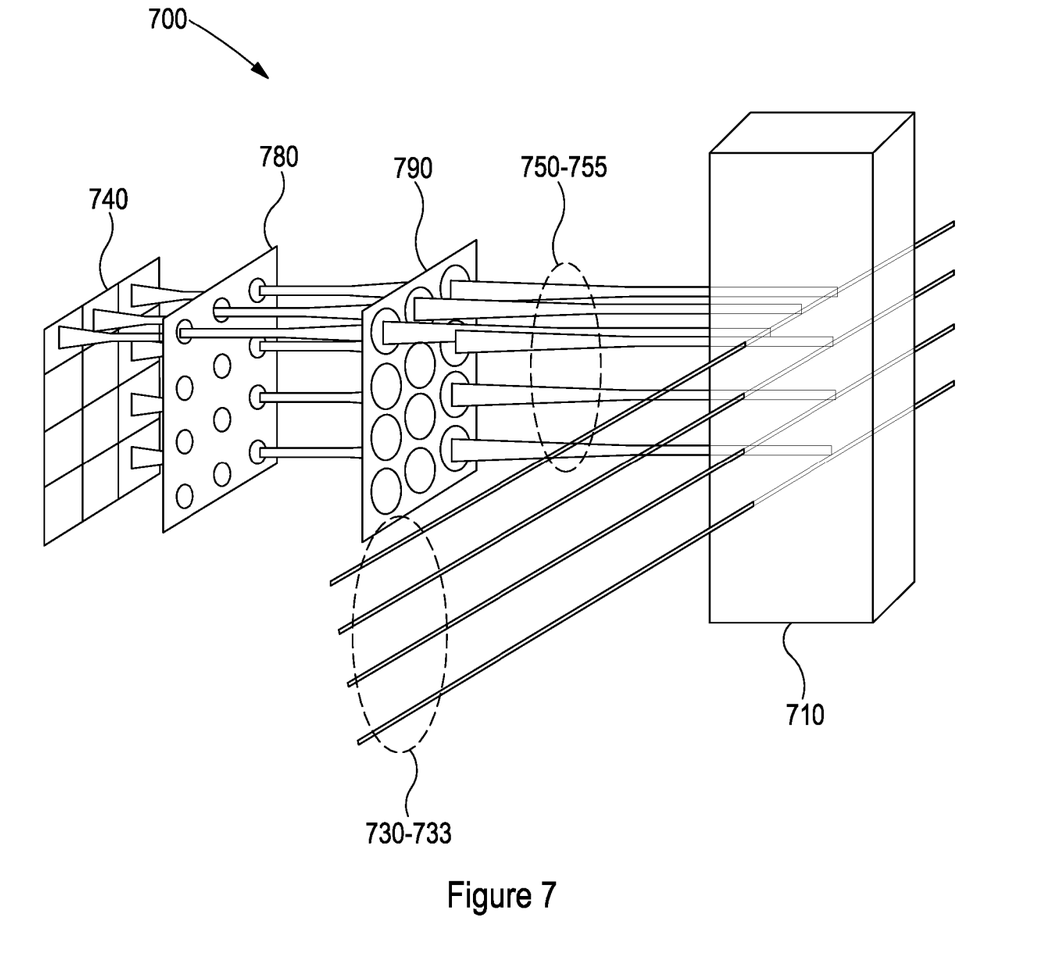
FIG. 7 is a schematic diagram of an embodiment comprising a pinhole aperture array, in which the plurality of light detectors are comprised in a focal plane array, each pinhole aperture defining a detection path to a respective light detector.

Referring to FIG. 7, an example embodiment of an apparatus 700 for particle characterisation is shown. In common with FIG. 3, the apparatus 700 comprises a sample cell 710 for holding a sample, a plurality of light detectors 740 arranged in an array and an array of lens elements 790.

Unlike in FIG. 3, a plurality of illumination beams 730-733 illuminate the sample. Each light detector within the array 740 is configured to receive scattered light resulting from the interaction between the illuminating beams 730-733 and the sample, along a respective detector path 750-755. Each respective detector path 750-755 is at substantially the same angle (in this case 90 degrees, but any other angle may be used) to the illuminating beams 730-733. An array of pin-hole apertures 780 is provided. Each aperture corresponds with a light detector in the array 740 and is arranged to couple light from the respective detector paths 750-755 to the corresponding light detector. The array of lens elements 790 couples the apertures 780 to the light scattered along each detection path 750-755. The detection paths may traverse further optical components between the pin-hole aperture array 780 and the detection points 740.

In this example, the sample cell 710 may be configured to translate (e.g. mounted on a translation stage) either normal or parallel to the illuminating beams 730-733. This arrangement allows for 3D information to be obtained, and can be applied to any application requiring 2D diffusion coefficient data such as gelling domains, solidification, settling and packing.

Figure 8:
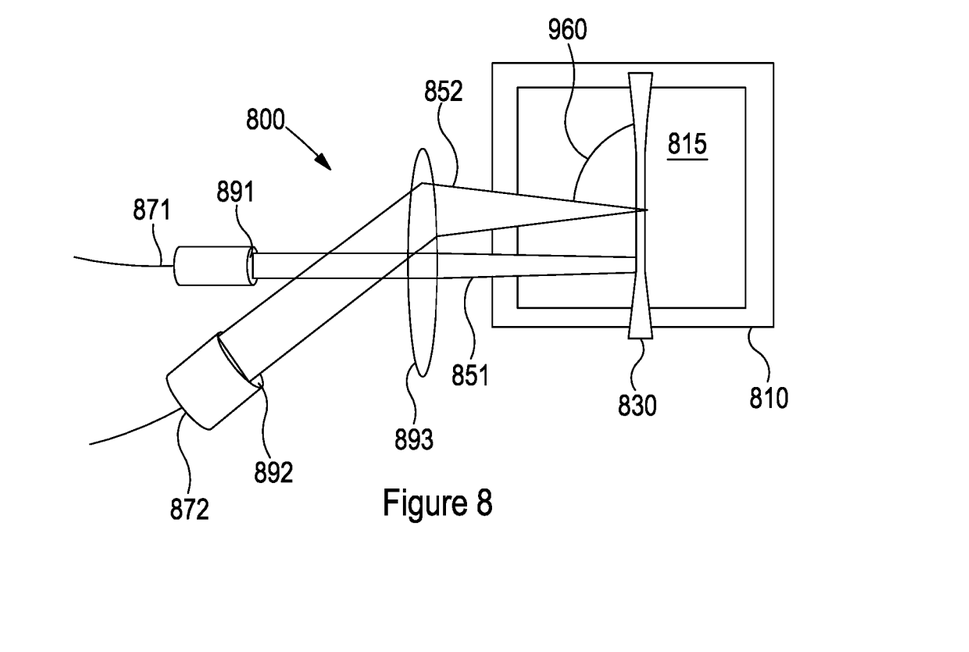
FIG. 8 is a schematic diagram of an embodiment in which end portions of respective optical fibres are arranged at different angles, and side scatter detection paths are focussed into the sample by a focussing lens.

Referring to FIG. 8, an further embodiment of an apparatus 800 for particle characterisation is shown. In common with the embodiment of FIG. 3, the apparatus 800 comprises a sample cell 810 for holding a sample 815, a light source (not shown), a plurality of light detectors and a plurality of optical fibres 871, 872.

Again, the light source is configured to illuminate the sample 815 with an illuminating beam 830 and each light detector is configured to receive scattered light resulting from the interaction between the illuminating beam 830 and the sample 815, along a respective detector path 851, 852. Each respective detector path 851, 852 is again at substantially the same angle 860 to the illuminating beam 830, and each optical fibre 871, 872 corresponds with a light detector and is arranged to couple light from the respective detector path 851, 852 to the corresponding light detector. Each optical fibre 871, 872 is arranged to receive said scattered light from each respective detector path 851, 852 at a first end portion.

Unlike in FIG. 2, the first end portions of the optical fibre are oriented at different angles, rather than being substantially parallel. Additionally, rather than an array of lens elements, the detector paths are initially refracted (from the sample cell 810) by a single lens 893. Each optical fibre 871, 872 is associated with a coupling lens (e.g. gradient-index or GRIN lens) 892, 893. These coupling lenses 892, 893 may be non-matching (e.g. having different spot-sizes and/or different effective focal length), and/or arranged such that each respective detector path 851, 852 diverges at different angles before entering each optical fibre 871, 872. Such an arrangement may be configured to yield matched beams widths along the focussed illumination beam 830.

Figure 9:
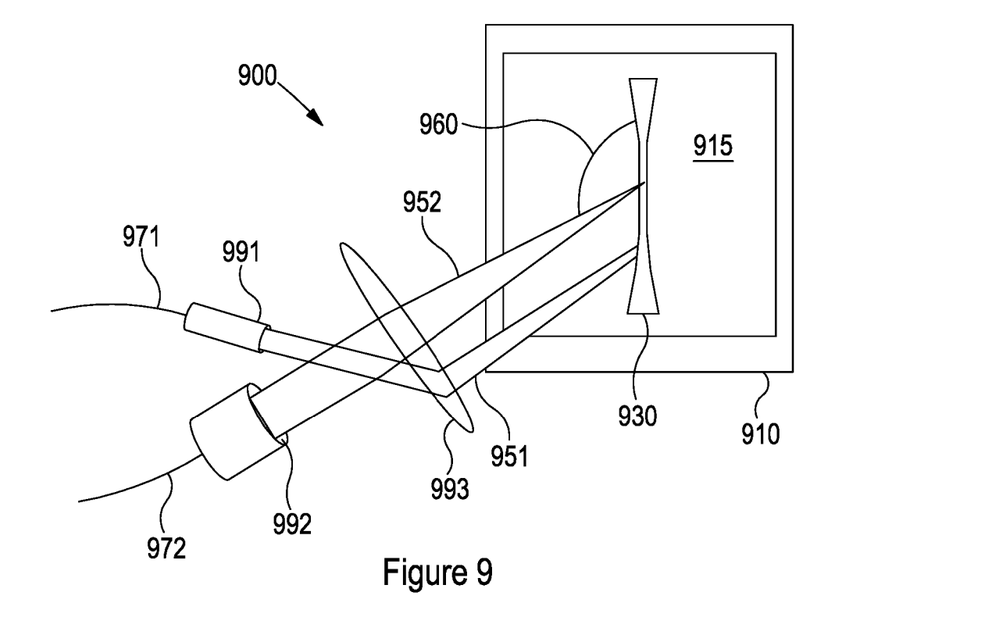
FIG. 9 is a schematic diagram of an embodiment in which end portions of respective optical fibres are arranged at different angles, and acute scatter angle detection paths (e.g. backscatter or forward scatter) are focussed into the sample by a focussing lens.

Referring to FIG. 9 an further embodiment of an apparatus 900 for particle characterisation is shown. The example apparatus 900 is the same as that of FIG. 8 (800), but illustrates that the apparatus 900 may be used for acute angle scattering in addition to (or as an alternative to) the 90 degree scattering illustrated in FIG. 8.

Although specific embodiments have been described, these are not intended to limit the scope of the invention, which should be determined with reference to the accompanying claims. A number of modifications and variations are possible, which are intentionally within the scope of the claims.

The invention claimed is:

1. An apparatus for particle characterisation, comprising:
 a sample cell for holding a sample;
 at least one light source configured to illuminate the sample with an illuminating beam;
 a plurality of light detectors, each light detector configured to receive scattered light resulting from the interaction between the illuminating beam and the sample along a respective detector path, wherein each respective detector path is at substantially the same angle to the illuminating beam and wherein the detector paths are arranged to respectively intersect with the illumination beam at a plurality of locations along the illumination beam; and
 a plurality of lens elements, each lens element corresponding with a light detector and arranged to couple light from the respective detector path to the corresponding light detector;
 wherein at least some of the detector paths from the sample diverge at a different rate.

2. The apparatus of claim 1, further comprising:
 a plurality of optical fibres, each optical fibre corresponding with a light detector and arranged to couple light from the respective detector path to the corresponding light detector.

3. The apparatus of claim 2, wherein each optical fibre is arranged to receive the scattered light from the detector path at a first end portion; and
 wherein the first end portions of each fibre are substantially parallel.

4. The apparatus of claim 3, wherein the first end portions of each optical fibre comprise a one dimensional array of fibres.

5. The apparatus of claim 3, wherein the first end portions of each optical fibre comprise a two dimensional array of fibres.

6. The apparatus of claim 2, wherein each optical fibre is arranged to receive the scattered light from the detector path at a first end portion; and
 wherein the first end portions of each fibre are oriented at different angles.

7. The apparatus of claim 3, further comprising one or more fibre support members.

8. The apparatus of claim 6, wherein the first end portions of the optical fibres are each supported by an array of "V" grooves in a fibre support member.

9. The apparatus of claim 3, wherein the first end portion of each optical fibre consists of an optical fibre core, from which any associated cladding, buffer and/or jacket has been removed.

10. The apparatus of claim 1, further comprising:
 a plurality of pin-hole apertures, wherein each light detector is configured to receive light from the respective detector path via a corresponding pin-hole aperture.

11. The apparatus of claim 1, wherein the plurality of lens elements comprises an array of lens elements.

12. The apparatus of claim 1, wherein at least some of the plurality of lens elements are non-matching.

13. The apparatus of claim 1, further comprising a plurality of light sources.

14. The apparatus of claim 1, wherein the at least one light source is configured to illuminate the sample with a plurality of illumination beams.

15. The apparatus of claim 1, further comprising a sample translation stage, configured to translate the sample cell normal and/or parallel to the illuminating beam.

16. The apparatus of claim 1, wherein said plurality of locations are at a plurality of different distances from a sidewall of the sample cell.

17. The apparatus of claim 16, wherein each detector path is arranged to intersect with the illumination path at a different location along the illumination path and/or at a different distance from a sidewall of the sample cell.

18. The apparatus of claim 1, wherein each detector is configured to produce an intensity signal in response to the scattered light, and the apparatus comprises a processor configured to autocorrelate each intensity signal to produce a plurality of autocorrelation functions and combine each autocorrelation function to produce a total autocorrelation function.

19. The apparatus of claim 18, wherein the processor is configured to determine, from the total autocorrelation function, at least one of: an average particle size, a polydispersity and a particle size distribution.

20. The apparatus of claim 18, wherein the processor is configured to identify and discard, or analyse separately, intensity signals and/or autocorrelation functions corresponding with contaminants or large particles.

21. The apparatus of claim 20, wherein the identification is based on predetermined rejection threshold or a dynamic rejection threshold.

22. The apparatus of claim 1, further comprising a first and second electrode and a surface, wherein the first and second electrode are operable to create an electrical field in the sample in a direction parallel with the surface, and the plurality of locations include locations that are different distances from the surface.

23. The apparatus of claim 22, further comprising a processor configured to determine a zeta potential from the output of light detectors corresponding with the measurement locations at different distances from the surface.

24. The apparatus of claim 23, wherein the apparatus is operable to determine a zeta potential without translating the surface and without translating any detector path or the illumination beam relative to the sample.

25. A method of determining a surface zeta potential, comprising:
providing an electrical field in a sample, adjacent to the surface;
illuminating a sample with at least one illuminating light beam;
detecting light scattered from the illuminating light beam by particles in the sample along a plurality of detector paths, each of the detector paths corresponding with a different light detector, the detector paths corresponding with a plurality of measurement locations at different distances from the surface, each detector path being at the same angle to the illuminating light beam and at least some of the detector paths from the sample diverging at a different rate; and
determining a surface zeta potential from the detected scattered light.

26. A method of determining particle size or particle size distribution, comprising;
illuminating a sample with at least one illuminating light beam;
detecting light scattered from the illuminating light beam by particles in the sample along a plurality of detector paths so as to produce intensity signals for each detector path, the detector paths corresponding with a plurality of measurement locations at different distances from the centre of the sample cell, each detector path being at the same angle to the illuminating light beam and at least some of the detector paths from the sample diverging at a different rate;
performing an autocorrelation operation on the intensity signals to produce autocorrelation functions;
identifying intensity signals and/or autocorrelation functions corresponding with contaminants and/or large particles;
combining the autocorrelation functions that are not identified as corresponding with contaminants, to produce a total autocorrelation function; and
determining the particle size or particle size distribution from the total autocorrelation function.

27. A method of determining particle size or particle size distribution, comprising;
illuminating a sample with at least one illuminating light beam;
detecting light scattered from the illuminating light beam by particles in the sample along a plurality of detector paths, each of the detector paths corresponding with a different light detector, the detector paths corresponding with a plurality of measurement locations at different distances from the centre of a sample cell, each detector path being at the same angle to the illuminating light beam and at least some of the detector paths from the sample diverging at a different rate;
excluding measurement locations that exhibit multiple scattering and/or insufficient scattering; and
determining the particle size or particle size distribution from the measurement locations that are not excluded.

* * * * *